United States Patent Office 3,574,123
Patented Apr. 6, 1971

3,574,123
PAINT STRIPPING COMPOSITION AND PROCESS
Millard J. Laugle, Cincinnati, Ohio, assignor to W. R. Grace & Co., New York, N.Y.
No Drawing. Filed Apr. 23, 1968, Ser. No. 723,567
Int. Cl. C09d 9/04; C11d 1/28
U.S. Cl. 252—144                                        10 Claims

ABSTRACT OF THE DISCLOSURE

Paints are removed from surfaces using a paint stripper comprising from 50 to 90 parts of a chlorinated liquid hydrocarbon solvent, 2 to 15 parts of a lower aliphatic alcohol or their glycol ethers, 0.1 to 15 parts of a lower carboxylic acid, 2 to 30 parts of hydroxybenzenes such as phenols or their derivatives, 2 to 10 parts fatty acid sulfonate or a salt of a fatty amine carboxylic acid having the formula

RNHR'COOH where R is an aliphatic group having from 8 to 18 carbons and R' is an alkyl group having from 1 to 8 carbons, or alkylbenzene sulfonic acid or salts thereof, from 0.1 to 10 parts of ammonium bifluoride dissolved in from about 3 up to 20 parts of water, and optionally, evaporation retarders and thickeners.

---

This invention relates to a paint stripping composition for removing or stripping paint, varnish, enamel, lacquer and the like for surfaces. In particular, this invention relates to a paint stripping composition which more efficiently removes paints such as epoxy, urethane, acrylate, phenolic, polyvinyl alcohol, and other difficult to remove resins.

In summary, the composition of this invention for stripping paint from surfaces comprises from 50 to 90 parts by weight of a chlorinated liquid hydrocarbon solvent; from 2 to 15 parts by weight of a coupling agent selected from the group consisting of lower aliphatic alcohols and their glycol ethers; from 0.1 to 15 parts by weight of an acid selected from the group consisting of formic, acetic, propionic, butyric acids and mixtures thereof; from 2 to 30 parts by weight of a member selected from the group consisting of phenols, alkyl substituted phenols having from 1 to 9 carbons in an alkyl group, nitro substituted phenols, dihydroxybenzenes and trihydroxybenzenes; from 2 to 10 parts by weight of a member selected from the group consisting of an alkylbenzene sulfonic acid having 8 to 18 carbons in the alkyl group or salts thereof a higher fatty acid sulfonic acid, salts thereof, a fatty amine carboxylic acid having the formula

RNHR'COOH where R is an aliphatic group having from 8 to 18 carbons and R' is an alkyl group having from 1 to 8 carbons, salts thereof, and mixtures thereof; from 0 to 5 parts by weight of an evaporation retarder; from 0 to 5 by weight of a thickener; and from 0.1 to 10 parts by weight of ammonium bifluoride dissolved in from above 3 up to 20 parts by weight water. In summary, the process of this invention is a method for stripping paint from surfaces comprising applying to the painted surfaces the above paint stripping composition and removing loosened paint from the surfaces. The term "paint" is intended to include coatings normally considered to be paints as well as and incuding, polymeric coatings, varnish, enamels, lacquers and the like.

Previously known paint removers were based on organic solvent compositions such as methyl ethyl ketone, turpentine, naphtha and the like; alkali based compositions; or for more resistant coatings, compositions containing organic acids such as formic acid, lactic acid, phenols and the like. With the advances of modern technology, exterior surface coatings based on new resinous materials have been developed to provide greater weather resistance, abrasion and high temperature resistance, and the like. Many of these coatings are based on cross-linked polymeric chains. The previously used organic solvent type paint strippers were entirely ineffective against these coatings. As a result, as disclosed in U.S. Pats. 3,335,087 and 3,335,088, anhydrous hydrofluoric acid containing paint strippers were developed. No substantial amount of water could be present in the compositions. The hydrofluoric acid could be present as the acid or as a loosely associated adduct of hydrofluoric acid which would release hydrofluoric acid in the paint stripper. Lewis Bases such as adducts of ammonia and hydrofluoric acid (probably ammonium bifluoride) are said in the patents to be entirely unsuitable for use in the paint stripping compositions.

It is an object of this i nvention to provide an aqueous ammonium bifluoride containing point stripping composition which is highly effective to remove all types of paints including epoxy, urethane, acrylate, phenolic, polyvinyl alcohol, and other resistant resins from surfaces.

All concentrations are herein given as weight percents or parts by weight unless otherwise specified.

The paint stripping composition of this invention contains the components in the concentrations set forth in Table A.

|  | Weight percent | |
| --- | --- | --- |
|  | Operable | Preferred |
| Chlorinated solvent | 30–90 | 40–70 |
| Coupling agent | 2–20 | 5–20 |
| Carboxylic acid | 0.1–15 | 1–10 |
| Hydroxy aromatic compound | 2–30 | 5–20 |
| Surfactant | 2–10 | 2–10 |
| Evaporation retarder | 0–5 | 0–5 |
| Thickener | 0–15 | 0–15 |
| Ammonium bifluoride | 0.1–10 | 0.5–5 |
| Water | 1–20 | 5–15 |

The chlorinated solvents which can be used in the composition of this invention comprise chlorine substituted aliphatic hydrocarbons having from 1 to 6 carbons which are liquid at room temperature and which are relatively inert to hydrofluoric acid. This group includes monochloro, dichloro, trichloro, and tetrachloro substituted aliphatic hydrocarbons. These include methylene chloride and in ascending molecular weight 1,2-dichloroethane; 1,3-dichloro propane; 1,4-dichlorobutane; 1,5-dichloropentane; and 1,6-dichlorohexane. Other chlorine substituted aliphatic hydrocarbons which are suitable include chloroform, carbon tetrachloride, 1,1-dichloroethane; 1,1-dichloropropane; 1,2-dichloropropane; 2,2-dichloropropane; 1,1,1 - trichloroethane; 1,1,2 - trichloroethane; 1,2,3 - trichloropropane; 1,1,2,2 - tetrachloropropane; 1,2,2-trichloroethane; perchloroethylene; 1-chlorobutane; 1,4-dichlorobutane; 1,2-dichlorohexane; monochloropentane; 1,3,4-trichlorohexane; 1,1-dichloropentane, 1,2-dichloropentane; 1,1,3-trichlorobutane; 1,2,3-trichlorobutane; 1,2,3-trichloropropane; 1,1,2,2-tetrachloropropane; 1,1,2,3-tetrachloropropane and 1,1,2,2-tetrachlorobutane. Also suitable are chlorine substituted inert aromatic solvents including, for example, ortho - dichlorobenzene, monochlorobenzene, monochlorotoluene, monochloroxylene and monochloroethylbenzene. The preferred chlorinated solvent is methylene chloride.

The composition of this invention can also contain inert organic aromatic hydrocarbon solvents including for example, benzene, toluene, xylene, ethylbenzene, orthoethyltoluene, diethylbenzene, isopropylbenzene, and the like. Because of their higher flash points, the lower alkyl substituted benzene boiling at 170° F. and higher are preferred.

The coupling agents, in general, are lower aliphatic alcohols and their glycol ethers. These include lower alkanols such as methanol, ethanol, and isopropanol and their glycol ethers, such as methyl, ethyl, propyl and butyl ethers of ethylene, diethylene, or propylene glycol. The preferred coupling agents are methanol and ethylene glycol monoethyl ether.

The hydroxyaromatic compounds which can be used in the composition of this invention include phenol, alkyl substituted phenols, nitro substituted phenols, dihydroxybenzenes and trihydroxybenzenes. Alkyl substituted phenols which are suitable have alkyl groups having from 1 to 9 carbons, and include lower alkyl phenols such as cresols and xylenols, lower alkyl phenols, and the like. Thus for example, ortho-, meta-, and para-cresol and 2,4-, 2,5-, 2,6-, 3,4-, and 3,5-xylenols can be used. Examples of suitable higher alkyl phenols include propyl, butyl, amyl, octyl, nonyl, isopropyl, isobutyl, isoamyl, tertiary butyl, and tertiary amyl phenols. The preferred phenols are mixture of cresylic acid and phenol.

The carboxylic acids which can be used in the composition of this invention have from 1 to 4 carbons and include formic acid, acetic acid, propionic acid, butyric acid, and mixtures thereof. A minor proportion of these aliphatic acids can be replaced with aromatic carboxylic acid such as salicylic or benzoic acids, for example, but the most active carboxylic acids are those having from 1 to 4 carbons. Formic acid is the preferred acid.

The composition of this invention also contains a surfactant. One suitable composition is a higher ($C_8$ to $C_{18}$) fatty acid sulfonic acid or salts thereof. The preferred salts are sodium, potassium and ammonium salts. A preferred sulfonic acid is the sodium salt of oleic acid sulfonate. Another suitable surfactant has the formula

RNHR'COOH where R is an aliphatic group having from 8 to 18 carbons and R' is an alkyl group having from 1 to 8 carbons and salts thereof. R is preferably a higher fatty group and R' preferably has from 1 to 4 carbons. Suitable salts include sodium, potassium, and ammonium salts. A preferred surfactant of this type is the sodium salt of n-coco beta amine propionate.

The composition of this invention can also contain an alkyl benzene sulfonic acid or its alkali metal or ammonium salts. The preferred alkyl benzene sulfonic acid is linear alkylbenzene sulfonic acid having from 8 to 18 carbons in the alkyl group, such as linear dodecylbenzene sulfonic acid.

The evaporation retarders which can be used in the composition maintain the composition unchanged after it has been sprayed or poured onto a coating to be removed by minimizing evaporation or fuming of the essential ingredients during the period of stripping the coating. Generally, wax, for example paraffin wax and microcrystalline wax, are employed for this purpose. The action of such waxes is assisted by the incorporation of small amounts of high molecular weight alcohols such as ethylhexanol and pine oil, as well as high molecular weight glycols such as hexylene glycol.

When the stripper of this invention is to be applied to coatings on inclined or vertical surfaces, it is usually desirable to incorporate into the composition a thickening agent to confer thixotropic properties to the composition. Suitable thickening materials include high viscosity methyl cellulose and/or soya flour or fibrous and polymeric thickeners developed for the paint industry.

The composition of this invention also contains greater than 3 weight percent water having ammonium bifluoride dissolved therein. It has been found that if the composition contains greater than 3 weight percent water and the ammonium bifluoride is dissolved in the aqueous phase, ammonium bifluoride is an adequate hydrofluoric acid source. This discovery is contrary to the teachings in U.S. Pats. 3,335,087 and 3,335,088 which make it clear that fluoride paint stripping compositions must be substantially anhydrous and must contain, as the hydrofluoric acid source, compounds other than Lewis Bases such as ammonium bifluoride.

The preferred compositions according to this invention are shown in Table B.

TABLE B

| | Weight percent |
|---|---|
| Methylene chloride | 40–70 |
| Methanol | 5–10 |
| Ethylene glycol monoethyl ether | 5–10 |
| Formic acid | 2–7 |
| Cresylic acid | 1–5 |
| Phenol | 5–10 |
| Dodecyl benzene sulfonic acid | 2–10 |
| Ammonium bifluoride | .1–3 |
| Water | 1–15 |

The compositions of the present invention are preferably applied to the coating to be removed by dipping the coated substrate into the compositions or by spraying or flowing the compositions over the coating. Brushing and roller coating are less preferred methods, but they can be used. Contact time between the stripper and the coating will generally be from one to 30 minutes, but is in all cases determined by the length of time required to loosen the coating from the substrate, and is not particularly critical. The stripper is applied to the coating at room temperature and atmospheric pressure for most processes. Agitation of either the work piece or the compositions will be preferred in most applications to cause the loosened coating to flake from the substrate with minimum use of stripping composition. The clean substrate should be rinsed immediately in an inert organic solvent, in rapidly running water, or in alkaline solutions.

An important aspect of the present invention is its ability to remove highly resistant resin coatings without substantially corroding the substrates, that is, the strength of the substrates are not impaired.

The method of this invention can be used to remove any "paints" from substrates, the paints including ad-phenolics, urethanes, and epoxides, nylons, polyvinyl tions, including the great majority of commercially available foams, encapsulating compounds and glues. For example, resins or paints of the following compositions are very effectively removed with this composition: silicone elastomers, acrylics, polyesters, polycarbonates, phenolics, urethanes, and epoxides, nylons, polyvinyl alcohols, polyvinyl chloride, and copolymers of the above.

By urethanes is meant resins which are based on polymerized ethyl carbamate and which therefore contain repeating units having the structure —NCO—.

By phenolics is meant resins made from phenols, including phenol, m-creso, p-cresol, resorcinol, and similar compounds; and generally produced by condensation with an aldehyde including formaldehyde, acetaldehyde, benzaldehyde, and furfuraldehyde.

By acrylics is meant resins formed by the polymerization of monomeric derivatives of acrylic acid or of alpha methyl acrylic acid or of other homologs of acrylic acid.

By nylon is meant any long chain synthetic polymeric amide having recurring amide groups as an integral part of the main polymer chain.

By neoprenes are meant those elastomeric type polymers which are basically polymers of chloroprene.

By polyvinyl chloride is meant polymers derived substantially from vinyl chloride.

By polyester resins is meant those produced by the polymerization of long chain poly basic acids, including sebacic, with polyhydric alcohols including glycol and glycerine with or without simultaneous polymerization of an admixed compound such as styrene.

By silicone elastomers is meant polymers built on a structure of alternate silicon and oxygen atoms with various organic groups attached to the unsaturated valences of the silicon atoms. The polymers may be cyclic, linear or cross linked in a wide variety of molecular weights including materials known commercially as silicone rubbers.

By epoxies is meant resins produced by the polymerization of an epoxide, including such compounds as ethylene oxide and epichlorohydrin, particularly with a diphenol. The chemical structure of epoxy resins is characterized by 3-membered rings consisting of two carbon atoms and 1 oxygen atom.

By polycarbonates is meant those polymers which are characterized by a substantial number of —O—CO— groups of the molecule.

This invention is further illustrated by the following specific but non-limiting examples.

EXAMPLE 1

The following compositions, when applied to several types of paints on various substrates very effectively loosened the paints within a few minutes without damaging the structure of the substrate.

TABLE C

| Sample | Concentration wt. percent | |
|---|---|---|
| | A | B |
| Methylene chloride | 55.0 | 50.0 |
| Toluene | 3.0 | 3.0 |
| Paraffin | 2.0 | 2.0 |
| Methyl cellulose | | 0.5 |
| Soya flour | | 4.5 |
| Methanol | 7.5 | 7.5 |
| Ethylene glycol monoethyl ether | 6.0 | 6.0 |
| Formic acid | 4.0 | 4.0 |
| Cresylic acid | 3.0 | 3.0 |
| Phenol | 7.4 | 7.4 |
| Linear dodecyl benzene sulfonic acid | 5.5 | 5.5 |
| Ammonium bifluoride | 2.0 | 2.0 |
| Water | 4.6 | 4.6 |

The ingredients in Table C were mixed together in the order listed, the ammonium bifluoride being dissolved in a portion of the water before being mixed with the other components.

EXAMPLE 2

The procedure of Example 1 was followed successfully with compositions identical to those listed in Table C except in one sample 2 wt. percent Sulfonate OA-5 (sodium salt of oleic acid sulfonate) and in another sample 2 wt. percent Deriphat 151 (sodium salt of n-coco beta amino proprionate) was substituted for the dodecyl benzene sulfonic acid.

Obviously, many modifications and variations of the invention as hereinabove set forth can be made without departing from the essence and scope thereof, and only such limitations should be applied as are indicated in the claims.

The invention claimed is:

1. A composition for stripping paint from surfaces consisting essentially of:
    (a) from 50 to 90 parts by weight of a chlorinated liquid hydrocarbon solvent, said hydrocarbon solvent having from 1 to 6 carbon atoms and being relatively inert to hydrofluoric acid;
    (b) from 2 to 15 parts by weight of a coupling agent selected from a group consisting of methanol, ethanol, isopropanol, and the methyl, ethyl, propyl and butyl ethers of ethylene glycol, diethylene glycol and propylene glycol;
    (c) from 0.1 to 15 parts by weight of an acid selected from the group consisting of formic, acetic, propionic, butyric acids and mixtures thereof;
    (d) from 2 to 30 parts by weight of a member selected from the group consisting of phenols, alkyl substituted phenols having from 1 to 9 carbons in an alkyl group, nitro substituted phenols, dihydroxy benzenes, and trihydroxybenzenes,
    (e) from 2 to 10 parts by weight of a member selected from the group consisting of an alkyl benzene sulfonic acid having from 8 to 18 carbons in the alkyl group, the sodium, potassium and ammonium salts thereof, a higher fatty acid sulfonic acid, the sodium, potassium and ammonium salts thereof, a fatty amine carboxylic acid having the formula

RNHR'COOH where R is an aliphatic group having from 8 to 18 carbons and R' is an alkyl group having from 1 to 8 carbons, the sodium, potassium and ammonium salts thereof, and mixtures thereof;
    (f) from 0 to 5 parts by weight of an evaporation retarder, said retarder being a wax selected from the group consisting of paraffin wax and microcrystalline wax;
    (g) from 0 to 15 parts by weight of a thickener, said thickener selected from the group consisting of high viscosity methyl cellulose, and soya flour; and
    (h) from 0.1 to 10 parts by weight of ammonium bifluoride dissolved in from above 3 up to 20 parts by weight of water.

2. The process of stripping paint from a surface comprising applying to the painted surface the composition of claim 1 and removing loosened paint from the surface.

3. The composition of claim 1 consisting essentially of:
    (a) from 40 to 70 parts by weight of said chlorinated liquid hydrocarbon solvent;
    (b) from 5 to 20 parts by weight of said coupling agent;
    (c) from 1 to 10 parts by weight of said acid;
    (d) from 5 to 20 parts by weight of said (d) member;
    (e) from 2 to 10 parts by weight of said (e) member;
    (f) from 0 to 5 parts by weight of said evaporation retarder;
    (g) from 0 to 15 parts by weight of said thickener; and
    (h) from 0.5 to 5 parts by weight of ammonium bifluoride dissolved in from 5 to 15 parts by weight water.

4. The process of stripping paint from a surface comprising applying to the painted surface the composition of claim 3, and removing loosened paint from the surface.

5. The composition of claim 1 consisting essentially of
    (a) from 40 to 70 parts by weight of methylene chloride,
    (b) from 5 to 10 parts by weight of methanol,
    (c) from 5 to 10 parts by weight of ethylene glycol monoethyl ether,
    (d) from 2 to 7 parts by weight of formic acid,
    (e) from 1 to 5 parts by weight cresylic acid,
    (f) from 5 to 10 parts by weight phenol,
    (g) from 2 to 10 parts by weight of dodecyl benzene sulfonic acid,
    (h) from 1 to 3 parts by weight of ammonium bifluoride dissolved in from 5 to 15 parts by weight of water.

6. The process of stripping paint from a surface comprising applying to the painted surface the composition of claim 5, and removing loosened paint from the surface.

7. The composition of claim 1 consisting essentially of
    (a) from 40 to 70 parts by weight of methylene chloride,
    (b) from 5 to 10 parts by weight of methanol,
    (c) from 5 to 10 parts by weight of ethylene glycol monoethyl ether,
    (d) from 2 to 7 parts by weight of formic acid,
    (e) from 1 to 5 parts by weight cresylic acid,
    (f) from 5 to 10 parts by weight phenol,
    (g) from 2 to 10 parts by weight of a sodium salt of oleic acid sulfonate,
    (h) from 1 to 3 parts by weight of ammonium bifluoride dissolved in from 5 to 15 parts by weight of water.

8. The process of stripping paint from a surface comprising applying to the painted surface the composition of claim 7, and removing loosened paint from the surface.

9. The composition of claim 1 consisting essentially of
 (a) from 40 to 70 parts by weight of methylene chloride,
 (b) from 5 to 10 parts by weight of methanol,
 (c) from 5 to 10 parts by weight of ethylene glycol monoethyl ether,
 (d) from 2 to 7 parts by weight of formic acid,
 (e) from 1 to 5 parts by weight cresylic acid,
 (f) from 5 to 10 parts by weight phenol,
 (g) from 2 to 10 parts by weight of a sodium salt of n-coco beta amino propionate,
 (h) from 1 to 3 parts by weight of ammonium bifluoride dissolved in from 5 to 15 parts by weight of water.

10. The process of stripping paint from a surface comprising applying to the painted surface the composition of claim 9, and removing loosened paint from the surface.

References Cited

UNITED STATES PATENTS

| | | | |
|---|---|---|---|
| 2,507,983 | 5/1950 | Kuentzel | 252—144 |
| 2,558,013 | 6/1951 | Staubly et al. | 252—143X |
| 3,264,219 | 8/1966 | McGrew et al. | 252—146X |
| 3,290,174 | 12/1966 | Kendall | 252—142X |
| 3,335,088 | 8/1967 | Mandell | 252—143 |

OTHER REFERENCES

Detergents and Emulsifiers, 1963 Annual, John W. McCulcheon, Inc., Morristown, N.J., 1963, pp. 46, 140.

HERBERT B. GUYNN, Primary Examiner

A. I. RUDY, Assistant Examiner

U.S. Cl. X.R.

134—38; 252—143, 153, 154, 161, 165, 170